United States Patent [19]
Coleman

[11] Patent Number: 6,088,122
[45] Date of Patent: *Jul. 11, 2000

[54] CREATION OF COLORANT CONTROLLED NEUTRAL BLACK OBJECTS IN A BIT MAP PRINTING SYSTEM

[75] Inventor: Robert M. Coleman, Altadena, Calif.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/829,646

[22] Filed: Mar. 28, 1997

[51] Int. Cl.[7] ........................................ B41B 15/00
[52] U.S. Cl. ........................ 358/1.9; 358/515; 358/529
[58] Field of Search ...................... 395/109; 358/534, 358/535, 536, 500, 563, 1.9, 515, 525; 347/15

[56] References Cited

U.S. PATENT DOCUMENTS

| | | | |
|---|---|---|---|
| 5,359,436 | 10/1994 | Dichter et al. | 358/500 |
| 5,493,323 | 2/1996 | Harrington | 347/251 |
| 5,712,924 | 1/1998 | Fujimoto et al. | 382/165 |
| 5,784,172 | 7/1998 | Coleman | 358/298 |
| 5,805,178 | 9/1998 | Silverbrook | 347/15 |

*Primary Examiner*—Andrew W. Johns
*Assistant Examiner*—Gregory Desire
*Attorney, Agent, or Firm*—Robert Cunha

[57] ABSTRACT

A method is described for printing a colorant controlled neutral black object in a bitmap-based digital color printing system. The method is useful in systems where the black colorant is not sufficiently opaque to hide non-neutral combinations of non-black colorants mixed into the black color. Black colors in a color printing system can be composed either of black colorant only or of black plus non-black colorants such as cyan, magenta, and yellow. If the non-black colorants are not mixed in nearly equal quantities, they will add hue to the black color. A sufficiently opaque black colorant can hide this objectionable non-black hue. However, in cases where the black colorant is not opaque enough, it is important to use equal or nearly equal combinations of cyan, magenta, and yellow so that little net hue will be introduced into the black color. Equally important in some printing systems is the ability to control the amount of total colorant used in forming a process black color. The invention proposes an efficient method for producing a colorant controlled, neutral black color when merging a black object into a color background for printing. The method involves reading the existing non-black background bits into a buffer, mixing them together and masking them to reduce the total colorant amount, or counting the ON bits and choosing a table entry based on this total, and outputting them again to the bitmap for printing.

4 Claims, 16 Drawing Sheets

CREATION OF COLORANT CONTROLLED NEUTRAL BLACK OBJECTS IN A BIT MAP PRINTING SYSTEM

BACKGROUND OF THE INVENTION

1. Field of the Invention

The present invention relates to bitmap-based digital color printing in which black objects and color objects are intermixedly printed, and more particularly, in which the non-black components of a black color are modified with a process which is responsive to the amount of non-black colorant already in the background color, creates a neutral color when mixed, and may be limited by a preset total colorant maximum.

2. Description of the Related Art

Bitmap-based digital color printers form a bitmap for each of several separations, such as cyan, magenta, yellow, and black. Each bitmap—one bitmap for each color separation—contains a 1 or a 0 for each point on the page which the print head of the color printer is able to address. By this method, the print head of the printer is instructed to turn on or off at each addressable point on the page. The bitmap for each color separation separately commands the print head that is assigned to print that particular color separation. Often, a full-color bitmap-based digital printer will construct a bitmap for cyan, magenta, yellow, and black, and then print each bitmap overlaid on the same page to produce a multitude of perceived colors through the combination of differing amounts of cyan, magenta, yellow, and black.

In particular, the color black may be formed of equal or nearly equal combinations of cyan, magenta, and yellow. In practice, the black colorant is also often added to the combination of cyan, magenta, and yellow colorants to increase the maximum density and avoid problems of unwanted color. When black is formed with a mixture of some of cyan, magenta, yellow, and black, it is known as process black. The color black may also be formed by using the black colorant alone. In this case, it is known as single-color black.

Each type of black, process black and single-color black, have advantages and disadvantages when used in different contexts in the printing process. When single-color black is used over a color field, it is often the case that the single-color black colorant has a gloss which is different from the gloss of the surrounding color field, and the gloss difference can be objectionable. Further, the maximum density of the single-color black colorant is often not as great as the maximum density obtainable with process black, and the density difference is particularly noticeable on certain color backgrounds. In addition, the ink coverage or toner pile height of single-color black may be noticeably less than that of the surrounding color background. Finally, the presence of misregistration between the plurality of separations during the printing process, or the presence of other interactions between the separations, can result in objectionable white or light-colored fringing around a single-color black object on a color background. This occurs for example if the single-color black colorant is not printed precisely and without distortion into the hole left at that position when printing the other separations. On the other hand, when process black is used in a white or gray field which does not contain any non-black colorants, slight misregistrations or interactions among the plurality of separations can result in objectionable color fringing at the edges of the object. Furthermore, the use of multiple colorants to form process black can result in blurred edges, thickened objects, and objectionable amounts of ink or toner coverage.

Process black can also cause problems if the same formulation of process black is used against a variety of color backgrounds. For example, a dense process black with a large amount of colorant, which might be suitable for printing over a dense or dark color background, when printed on a light colored background can create pile height or ink coverage differences between the black object and its light colored background. This can result in printing defects such as tactile unevenness or toner deletion in the background color surrounding the black object. A process black with smaller values of C, M, Y may be better suited for light backgrounds, but can show problems of "caving" if its total pile height is less than the height of the surrounding background for darker backgrounds. Further, if the C, M, Y content of a process black is significantly less than that of the color background, the chances for showing light fringes around the process black object due to misregistration is increased.

These advantages and disadvantages of single-color and process black are known in the graphics arts industry, and knowledgeable graphic artists attempt to design pages which utilize the advantages and avoid the disadvantages. However, some situations, such as a black object placed only partially over a color field, or a color background which changes rapidly, or complex text or graphics over a complex color background, make it difficult to avoid the printing problems associated with mixedly printing black and color. Furthermore, many pages not designed by a knowledgeable graphic artist can benefit from a method and apparatus to automatically create a background dependent black image.

U.S. Pat. No. 4,700,399 to Yoshida discloses a color image processing apparatus which has an edge detector and a control unit for controlling a black reproduction quantity for an edge according to an output from the detector. For edges, densities of color signals for yellow, magenta, and cyan are reduced in accordance with the edge quantity to increase black density.

U.S. Pat. No. 4,953,015 to Hayasaki et. al. discloses a method for printing a color image which makes it possible to obtain a higher density black. Black ink is placed first, and then a plurality of other inks such as cyan, magenta, and yellow are allotted according to a color matrix table and are superimposed on at least a portion of the black ink.

U.S. Pat. No. 5,241,396 to Harrington discloses a method for printing a color image which yields dense black images without thickened, blurred edges. A modified black bitmap is produced by eroding the edges on the original black bitmap. The modified black bitmap is used to instruct the printing of at least one other colorant and then the original black bitmap is used to print the black colorant to yield a dense black image.

These methods have in common the attempt to limit the blurring disadvantages of process black on a white background so that it can be used in place of single-color black.

U.S. patent application Ser. No. 08/673541, "Color Bitmap Generation with Background Dependent Black Objects", discloses a bitmap color printing method which modifies the normal bit block transfer method by which objects are merged into a bitmap prior to printing, in order to be able, without prior knowledge of the current content of the bitmap, to change a black color as it is being merged into the bitmap so that its colorant content is responsive to the background color. (The background color may include white). This helps to maximize print quality when intermixedly printing black objects and color objects. However, this method does not address a problem that by mixing the background colors into the black, it is possible to obtain a process black which in some printing systems contains excessive colorant levels that can create other printer defects such as xerographic "tenting".

U.S. patent application Ser. No. 08/760,204, "Color Bitmap Merging of Black Objects Using Separation Maximum Value Clipping", discloses a bitmap color printing method which modifies the normal bit block transfer method to change a black color as it is being merged into the bitmap so that its colorant content is responsive both to the background color and also to a predetermined maximum colorant level per separation. In this way, the colorant levels in the black object are background-dependent but controlled. This helps to maximize print quality when intermixedly printing black objects and color objects by controlling a larger range of printer defects.

Both of these methods disclosed, however, may create additional printer defects on a system in which the black colorant is not sufficiently opaque to cover off-neutral hues. By being responsive to the background color when mixing colorants into the foreground process black, the methods described may create off-neutral hues in the resulting black color. If responsiveness to the background color causes non-neutral combinations of non-black colorants to be mixed into the black color, and the black colorant is insufficiently opaque to cover the non-neutral hue, then objectionably non-neutral black colors may be created.

By contrast, the current invention describes a bitmap color printing method for generating a process black color that is not only responsive to the amount of colorant in the background and to a predefined limit on total colorant, but also ensures that the generated process black color contains a neutral or near-neutral mix of non-black colorants. In the method described in U.S. patent application Ser. No. 08/760, 204, the amount of each non-black colorant found in the background is mixed into the process black foreground up to a predetermined limit for each separation. Instead, the current invention proposes to limit the amount of each colorant not only with a preset maximum, but also by taking into account the other colorants present in such a way as to produce an equal amount of each non-black colorant, which will create a neutral or near-neutral mixture. In this way, neutral black colors are achieved while still maintaining the goal of limiting the amount of non-black colorant in a black object and being responsive to the background color in order to improve print quality.

OBJECTS AND SUMMARY OF THE INVENTION

One object of the present invention is to provide a method for determining when a black object is being printed and changing the method for merging it into a bitmap such that the gloss, density, and colorant level of the black color better conforms to the gloss, density, and colorant level of a color background, and the black color remains neutral or near-neutral in hue.

Another object of the present invention is to provide a method for determining when a black object is being printed and changing the method for merging it into a bitmap such that the total colorant amount in the black object is regulated in relation to a color background, and the black color remains neutral or near-neutral in hue, so as to reduce observable printing defects.

To achieve the foregoing and other objects and to overcome the shortcomings discussed above, a bitmap-based digital color printing method and system is provided which automatically detects when a black object is commanded to be printed, and changes the method by which the black object is merged into the bitmap of each of the color separations in such a way that the composition of the black color remains neutral or near-neutral, contains a total colorant amount limited by the minimum of a pre-set allowed total colorant and the total colorant already in the background at the position on the page at which the black object is commanded to be printed.

As objects are commanded to be printed, a detection operation detects if the objects are commanded to be printed in a black color—either a single-color-black or a process black. If so, an alternate Bit Block Transfer (BitBlt) method is chosen which merges the black color into the existing bitmaps in a way which creates a neutral black color yet is limited by the minimum of the background color already in the bitmap at that point or a pre-set upper limit of total colorant. Because a bitmap generally is composed of bits which have been generated by a halftoning process, it is unduly time-consuming to take a step of determining the actual color which has previously been commanded to be printed at the location at which the black object is commanded to be printed. Furthermore, in a multiple-halftone bitmap printing system, the halftone dot used at any point on the page is variable, and it is unduly time-consuming to determine which dot was used in forming the existing background at the point at which the black object is to be merged. Therefore, the alternate BitBlt method described is one which is not dependent on prior knowledge of the background color or of the particular halftone dot used. Instead, since a typical BitBlt operation consists of the steps of Read, Modify, Write, the Modify step in the case of a black object is adjusted to be responsive both to the information obtained by the Read operation and to the predetermined total colorant limit, but relatively unresponsive to the particular halftone dot at that position of the bitmap. More specifically, the clipping can be accomplished at the bit level during the Modify step in one of two preferred ways. If the halftone dots of each separation are known to be largely uncorrelated, as in a system which uses rotated dots or other dot-off-dot halftoning, then the Read step can read each of the c, m, y separations and OR them into a buffer. This will effectively create a buffer within which any spot which is turned on in any of the separations will be turned on in the buffer. The buffer then represents the total non-black colorant at that position on the page. The Modify step may then AND such a buffer with a distributed screen which represents one third of the preset maximum colorant amount allowed, and the Write step will write that one third representation into each of the non-black separations when writing the black object. Thus, the black object will contain equal amounts of non-black colorant, which normally will produce a neutral or near-neutral black color, and furthermore, the amount of black colorant will be limited by the minimum of either the current background colorant amount or a preset maximum colorant allowed. As an alternative method, if the halftones are correlated and often overlap, as in a dot-on-dot system for example, the Read step would read each non-black separation into a buffer, identify the number of bits turned on, and use the total of all bits turned on in all non-black separations to calculate a bit pattern or look-up a bit pattern to use in the Write step in each of the separations. In this way, each separation has the same amount of colorant, but the total colorant output is related to the background color and the total colorant allowed is limited as necessary to mitigate printer defects.

BRIEF DESCRIPTION OF THE DRAWINGS

The invention will be described in detail in reference to the following drawings in which like reference numerals refer to like elements and wherein.

DETAILED DESCRIPTION OF THE PREFERRED EMBODIMENTS

Figure 1:
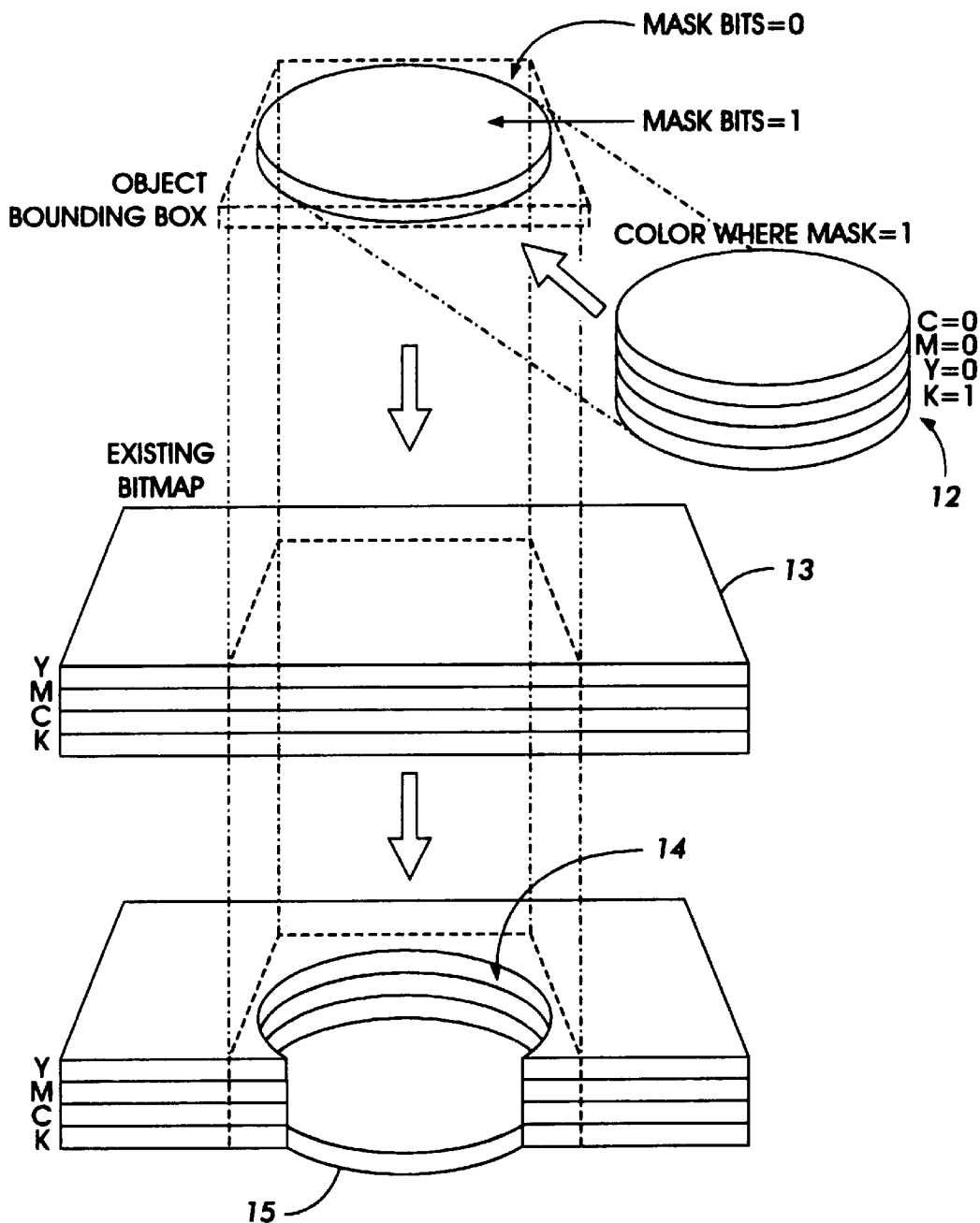
FIG. 1 shows a method of the prior art by which a single color black object is merged into existing separation bitmaps during the page preparation process.

Referring now to the drawings, and particularly to FIG. 1 thereof, a single-color black object is shown being merged into an existing set of bitmaps, one bitmap per separation, which in this case comprise cyan (C), magenta (M), yellow (Y), and black (K). The object is defined by an object bounding box 10 showing the maximum extent of the object, a mask 11 defining the actual shape of the object wherever the bits are on (mask bits=1) within the bounding box 10, and a color 12 which is the color in effect wherever the mask is on (mask bits=1). In the prior art, for each separation bitmap, the merging process causes the color value 12 of that separation to be written into the existing bitmap 13, obliterating whatever values were in that separation previously. In the case of a single-color black color 12, in which the non-black separation values are all 0 (white), the effect is to erase the non-black separations (i.e., to put no colorant on the page so that the white paper shows through). The black separation is then written as full-black value (1) into the black separation. The net effect is a hole 14 in the other separations and a single-color black object 15 at the bottom of that hole.

Figure 2:
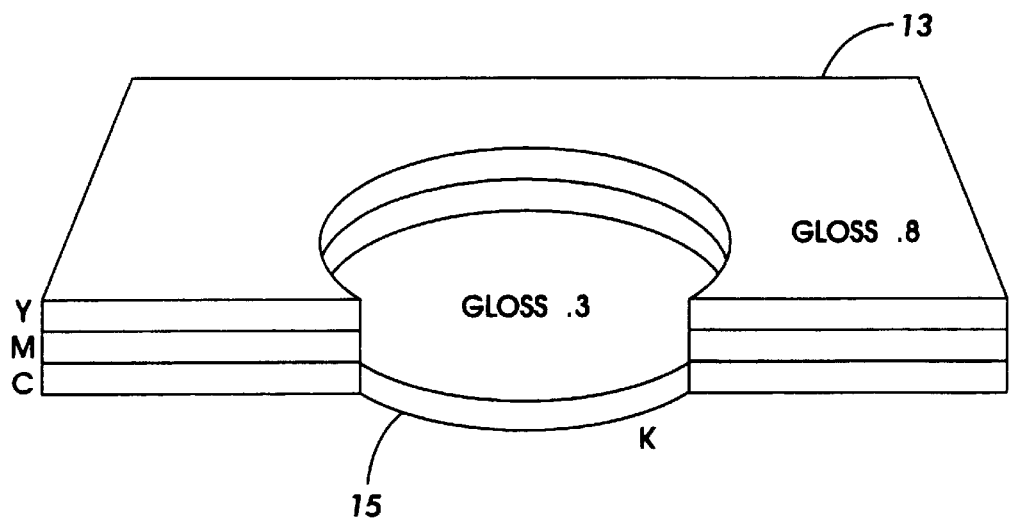
FIGS. 2 and 3 show sample outputs which demonstrate print quality problems produced by following the prior art method illustrated in FIG. 1.
Figure 3:
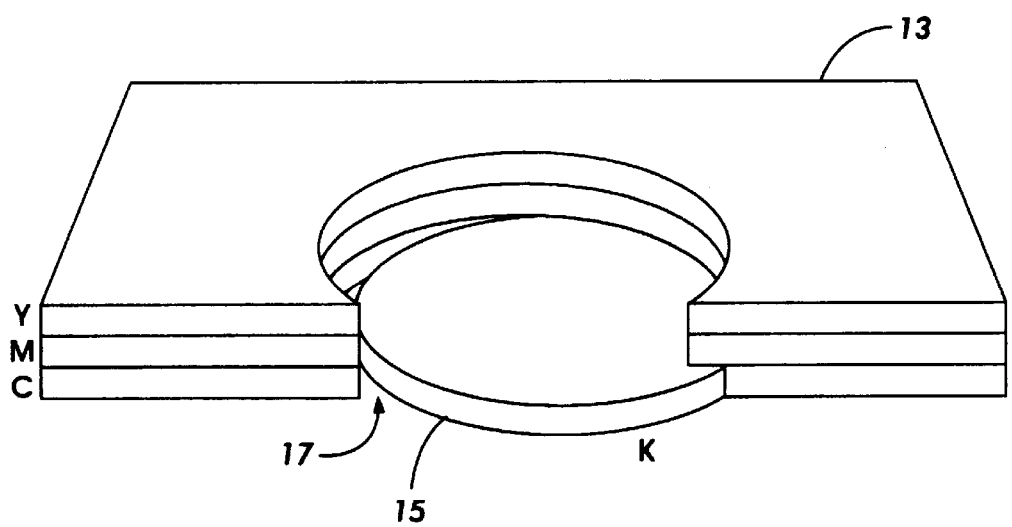

FIGS. 2 and 3 show print quality problems which can occur as a result of the prior art method shown in FIG. 1. In FIG. 2, the single-color black object 15 can be seen to have a gloss level and coverage level (toner height, in the example shown) which may be objectionably different from the color background 13. It is not shown that a single-color black object 15 may also have an inadequate maximum density when imaged on some color fields. A further problem is shown in FIG. 3. In this case, an objectionable white fringe 17 can occur around part of the single color black object 15 due to misregistration of object 15 in relation to the surrounding color field 13.

Figure 4:
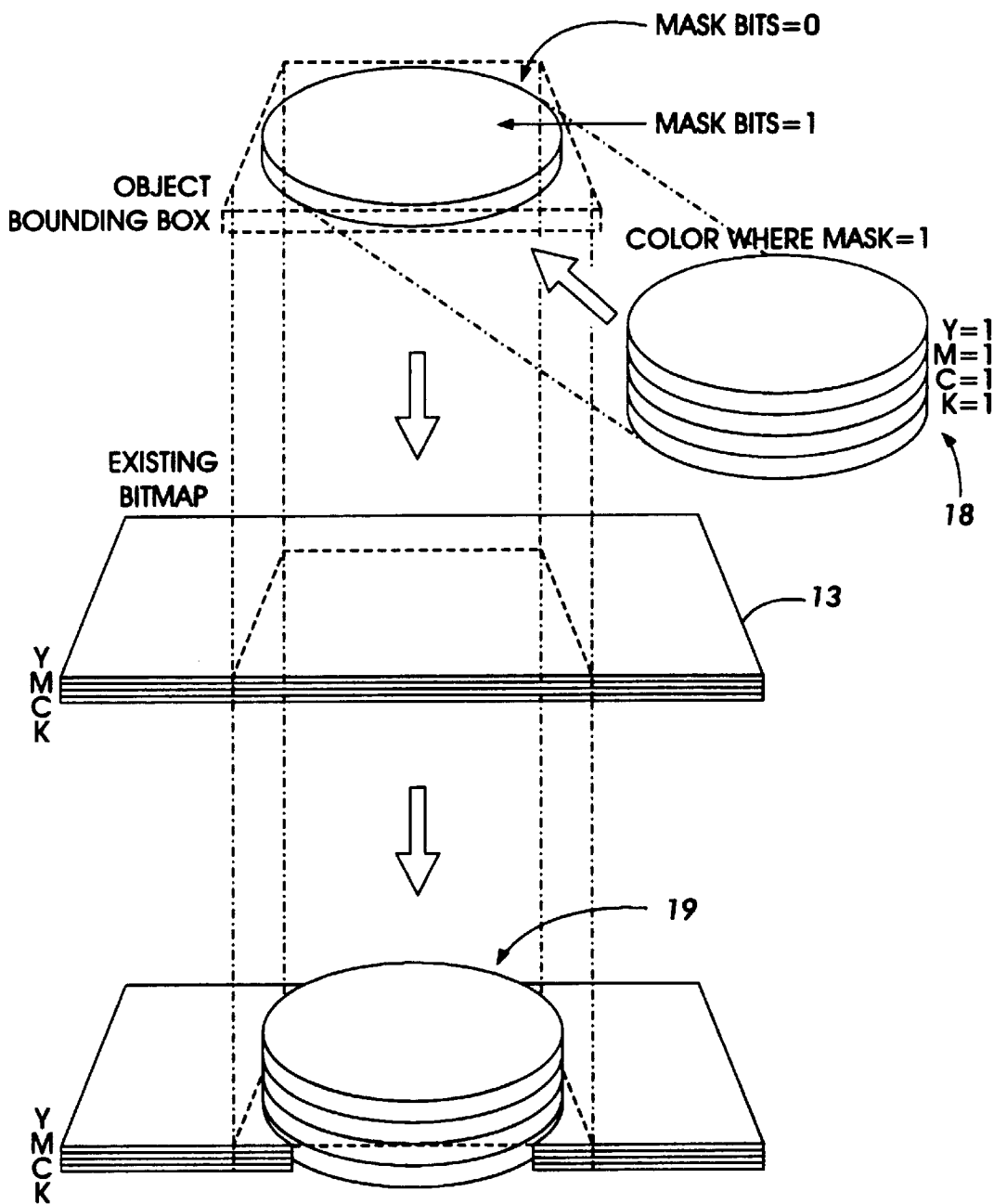
FIG. 4 shows a method of the prior art by which a process color black object is merged into existing separation bitmaps during the page preparation process.

The opposite effect is shown in FIG. 4. In this case, a black object whose color is process black 18 instead of single color black is shown being merged into an existing set of bitmaps 13, one bitmap per separation. As explained in FIG. 1, in the prior art, for each separation bitmap, the merging process causes the color value of that separation to be written into the bitmap, obliterating whatever values were in that separation previously. The net effect in this case is a large change in colorant coverage in each separation, and a very large change in colorant coverage overall at the location of the merged process black object 19.

Figure 5:
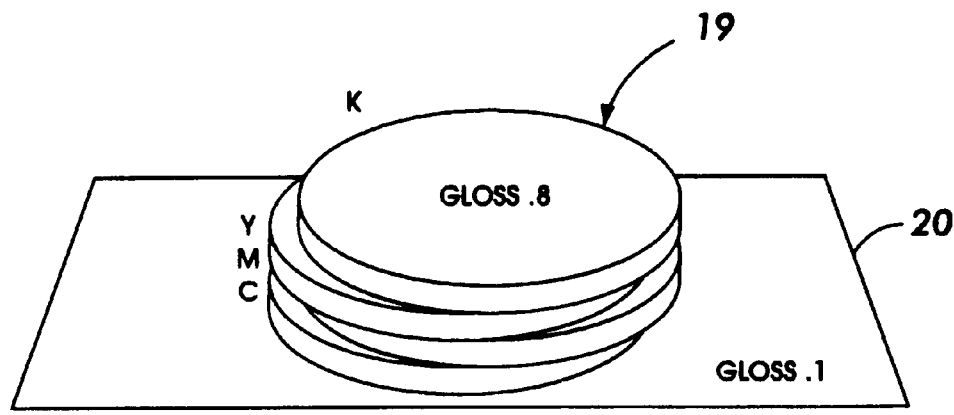
FIGS. 5 and 6 show sample outputs that demonstrate print quality problems produced by following the prior art method illustrated in FIG. 4.
Figure 6:
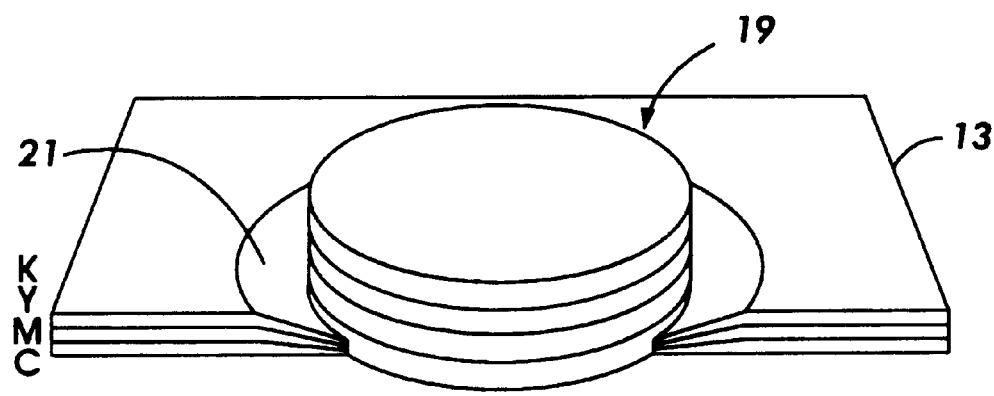

Some problems in print quality that the process black merging method shown in FIG. 4 may cause are shown in FIGS. 5 and 6. In FIG. 5, a process black object 19 is shown being imaged on top of a white paper background 20 using process black composed of cyan, magenta, yellow, and black toners. As shown in FIG. 5, in certain printing systems objectionable height differences can occur between the white background and the total pile height of all toners used in a process black. Further, large differences of gloss can occur. Also, with slight misregistration between separations, the edge of the process black object can spread, blur, and show chromatic fringes. Other problems with excess colorant coverage not shown in FIG. 5 can also occur, such as excessive bleeding and spread caused by excess ink in certain ink jet color printing systems. FIG. 6 shows a further problem with the prior art method of merging a process black object 19 into an existing bitmap 13. In some printing systems such as xerographic systems, the excess toner height will also cause additional deletions 21 in the color background surrounding the process black object, resulting in objectionable light colored fringes around the black object 19.

Figure 7:
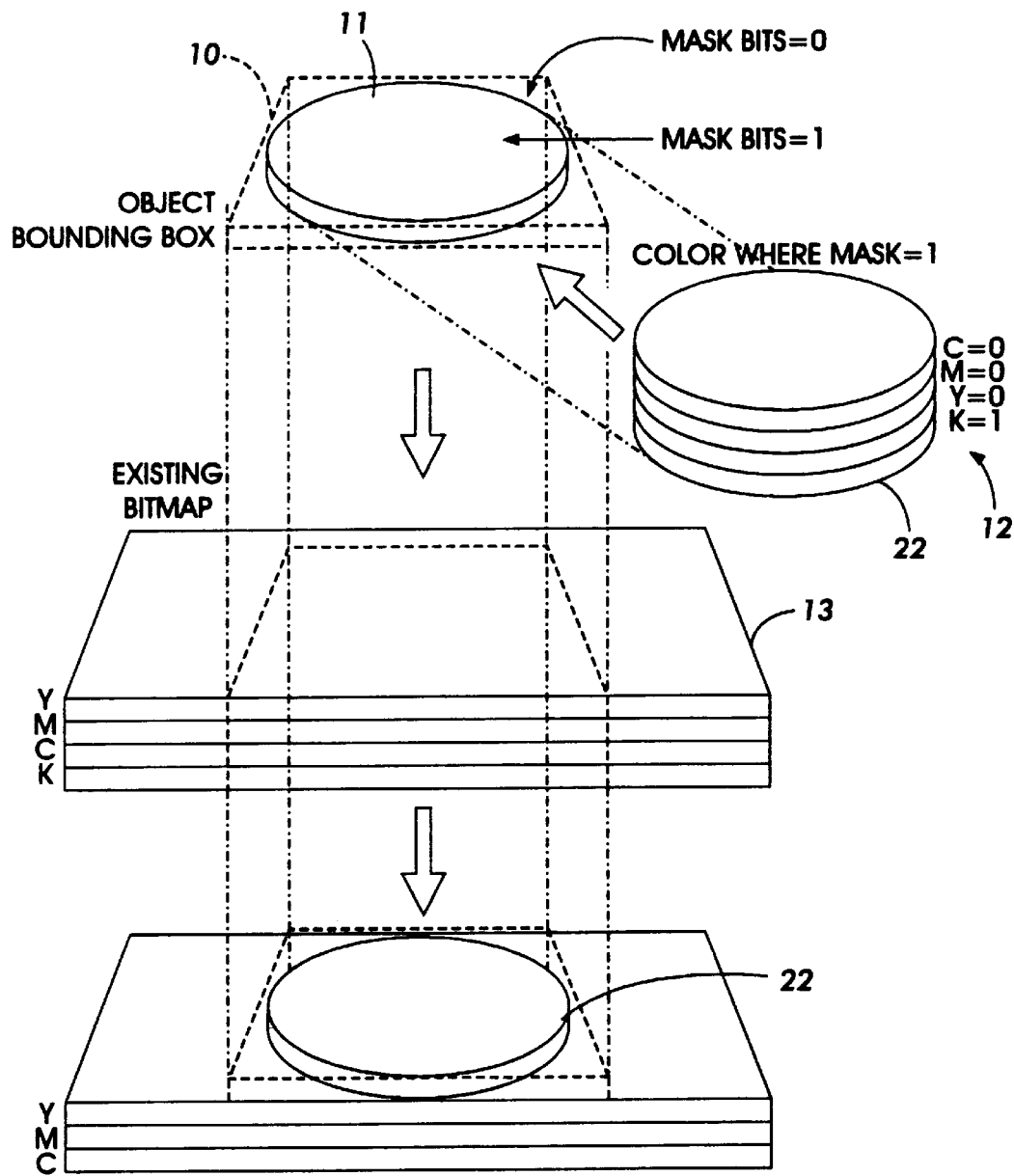
FIG. 7 shows a further step in the prior art shown in patent application Ser. No. 08/673541 in which a single color black object is merged into existing separation bitmaps during the page preparation process while preserving the background color.

FIG. 7 shows a prior art method (described in patent application Ser. No. 08/673541) which is a different method from that shown in FIG. 1 for merging a single-color black object 15 into separation bitmaps. In this method, black objects with single color black color 12 are detected and merged differently from color objects into the existing bitmaps 13. Instead of writing the current value of each separation into the corresponding separation as in FIG. 1, only the black separation 22 is written, and the other separations are left intact. The color remains black because of the opacity of the black ink coverage, but the underneath color is unchanged.

Figure 8:
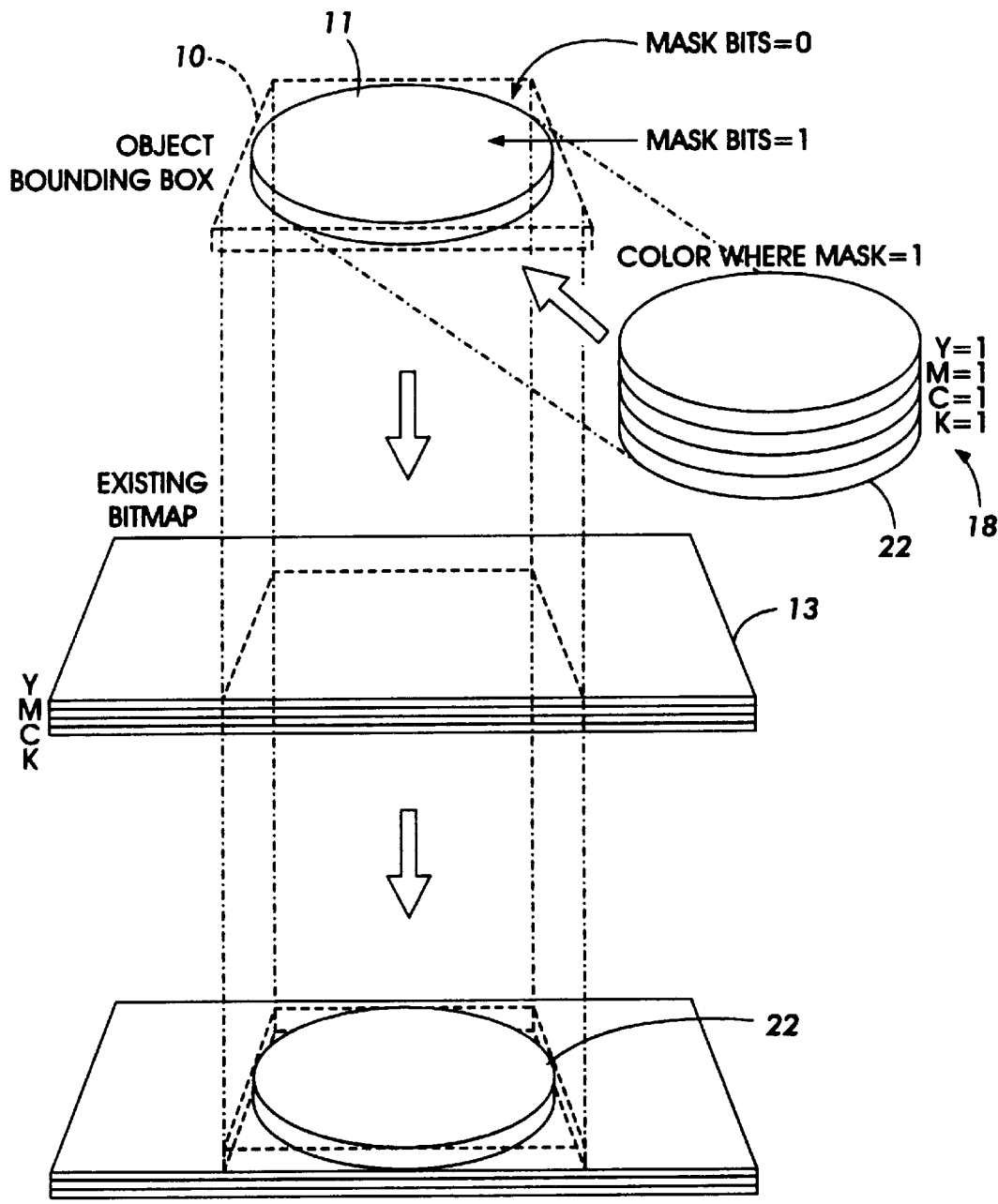
FIG. 8 shows a further step in the prior art shown in patent application Ser. No. 08/673541 in which a process black object is merged into existing separation bitmaps during the page preparation process while preserving the background color.

Similarly, FIG. 8 shows the result of this different prior art method when a process black color 18 containing non-black colorants is merged into existing separation bitmaps 13. Again, the values in the non-black separations are ignored, and only the black separation 22 is written.

Figure 9:
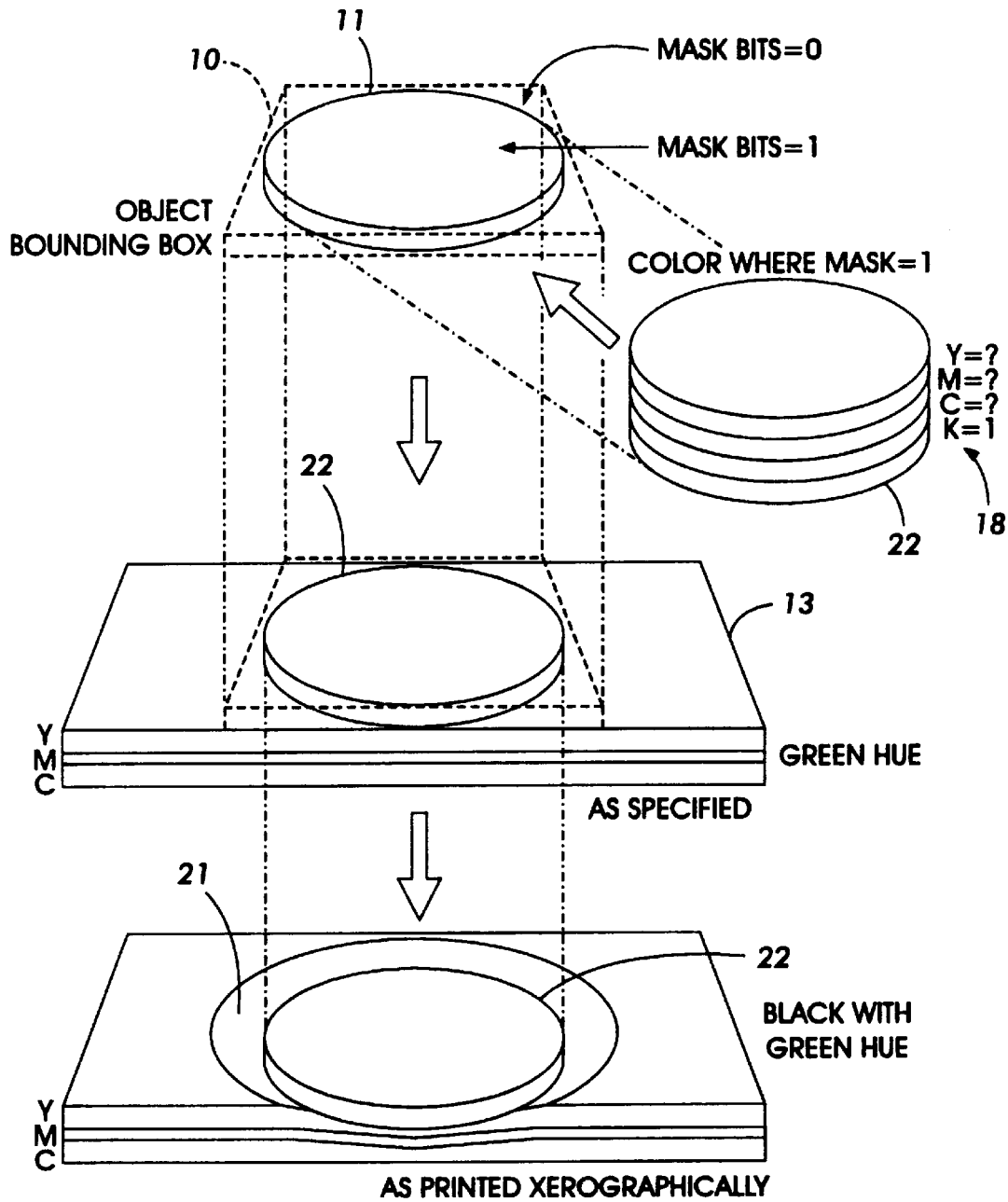
FIG. 9 shows an example of potential print quality problems which can be introduced by following the prior art method illustrated in FIGS. 7 and 8, in cases where the background color plus the black results in excessive total colorant and also where the black is not sufficiently opaque. In xerographic printing, excessive colorant leads to a toner pile that is high enough to cause transfer problems of surrounding toner, leading to a visible and objectionable lessening of the toner surrounding a high-toner object. Furthermore, an insufficiently opaque black colorant may not be able to mask non-neutral hue created by the background color.

FIG. 9 illustrates two problems that can arise using the prior art method of FIGS. 7 & 8. FIG. 9 shows that, particularly if the colorant coverage of the non-black separations 13 is already large, the addition of a full-black layer 22 on top can sometimes cause too much total colorant, which in some xerographic systems, for example, can again result in deletions 21 in the toner surrounding the imaged black layer 22. Furthermore, if the black colorant 22 is insufficiently opaque, it may not satisfactorily mask an existing non-neutral hue created by the background color beneath the black layer.

Figure 10:
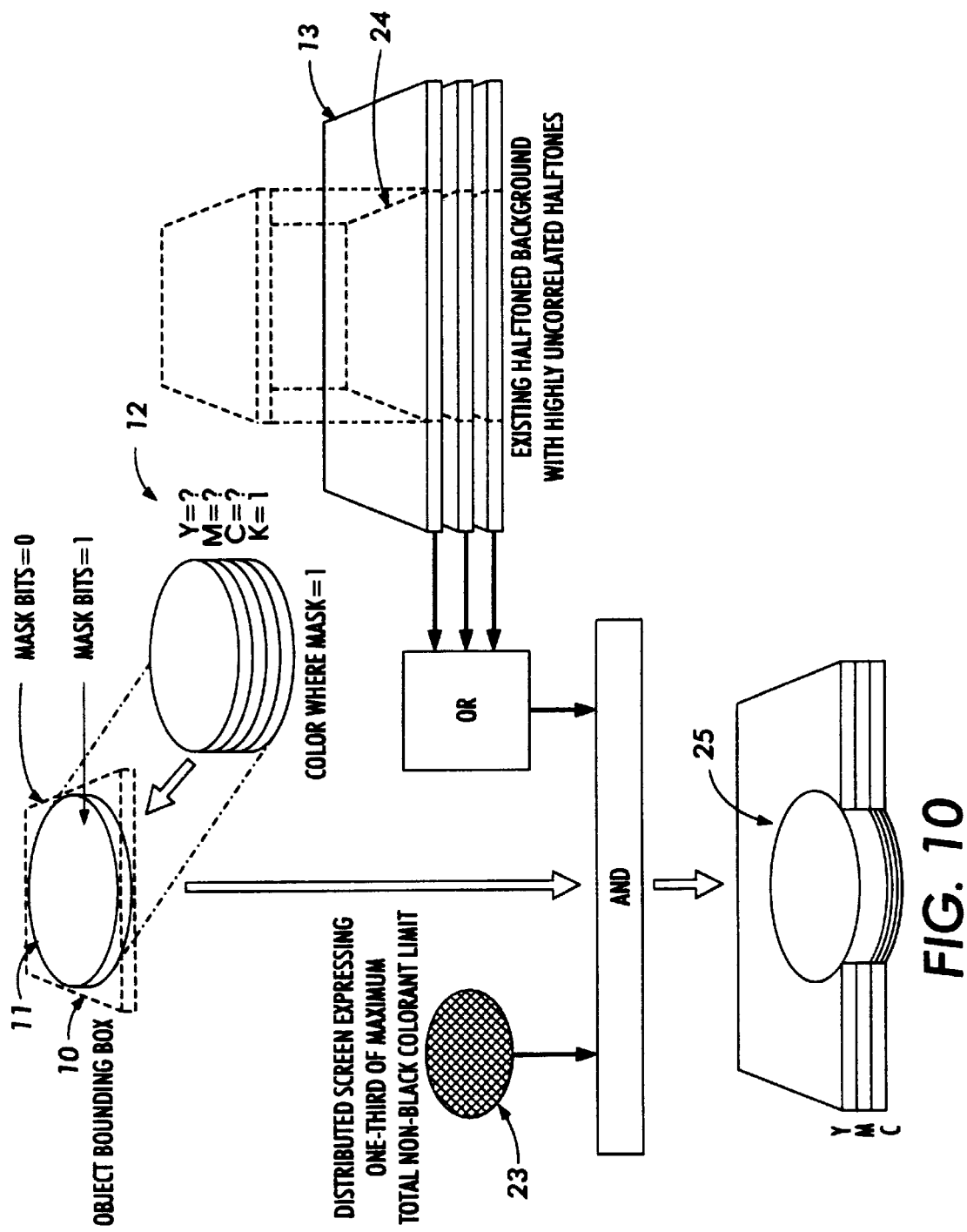
FIG. 10 shows a method of the current invention by which the problem of excessive colorant shown in FIG. 9 can be avoided and also a neutral black color created in bitmap systems, by efficiently calculating with an OR process or a bit-counting process the total colorant in use in the background and writing an equal fraction of that total into each of the non-black colorants when merging into existing separation bitmaps.

By contrast, FIG. 10 shows how the method of this invention processes a black object in a bitmap printing system to mitigate the problems of too much colorant and of non-neutral black objects as shown in FIG. 9. In FIG. 10, a black object is shown being merged into an existing set of bitmaps, one bitmap per separation, which in this case comprise cyan (C), magenta (M), yellow (Y), and black (K). As in previous figures, the object is defined by an object bounding box 10 showing the maximum extent of the object, a mask 11 showing the actual shape of the object, and a black color 12 which is in effect wherever the mask is on.

Prior to processing, two factors have been pre-determined. First, a special distributed screen is designed not for optimal rendering properties but rather to be well-distributed so as to be more useful as a clipping agent against any halftone design. Second, an upper limit on the total allowed non-black colorant amount beneath a black object is established, and that upper limit is divided by the total number of non-black separations (generally three—C, M, Y) to provide a single number that is the maximum allowed colorant amount for each separation. That amount of maximum colorant allowed for each non-black separation is then halftoned using the distributed halftone screen and stored in a buffer 23.

Then, whenever a black object defined by bounding box 10, shape 11, and color 12 is to be merged, the system first reads (from the existing bitmap 13) the existing bits 24 at the location into which the black object will be merged. In a system with minimal correlation between halftones of each separation, these existing bits 24 are then OR'ed together to provide a record of the total bits turned on in all non-black separations at the current location. Those on-bits are then logically bitwise ANDed with the pre-established limiting bits 23 and the result 25 is then merged into each separation. For systems whose halftones between separations are correlated, as in a dot-on-dot system, the OR process will not provide a total bit count since many bits will be on top of each other and will therefore only be counted once by an OR. In that case, any of a number of efficient bit counting methods may be used, and the total bit count used to look up or generate a corresponding representative total bit pattern. Alternatively, in certain halftone designs, a simple skew or shift of the bits of one or two of the separations may be sufficient to remove the correlation and allow an OR process to be effective in picturing the total bits turned on.

Assuming that the halftoned limiting bits 23 are fairly well correlated with any of the halftones which might be found in existing bits 24, the merge bits resulting from the OR of existing bits 24 AND'ed with limiting bits 23 will, when merged uniformly into each separation, track with but be less than the existing total bits in the background. Once the allowed limit is reached, the new merged bits will still be evenly distributed among the separations to produce a neutral black color, but will be limited by the allowed limit 23. Thus, the background beneath a black object will track with the previously existing background up to a set limit, and then will remain constrained by that limit. In all cases, however, the new background beneath the black will stay equal in each non-black separation and thus produce a neutral or near-neutral mix of colorants.

Figure 11:
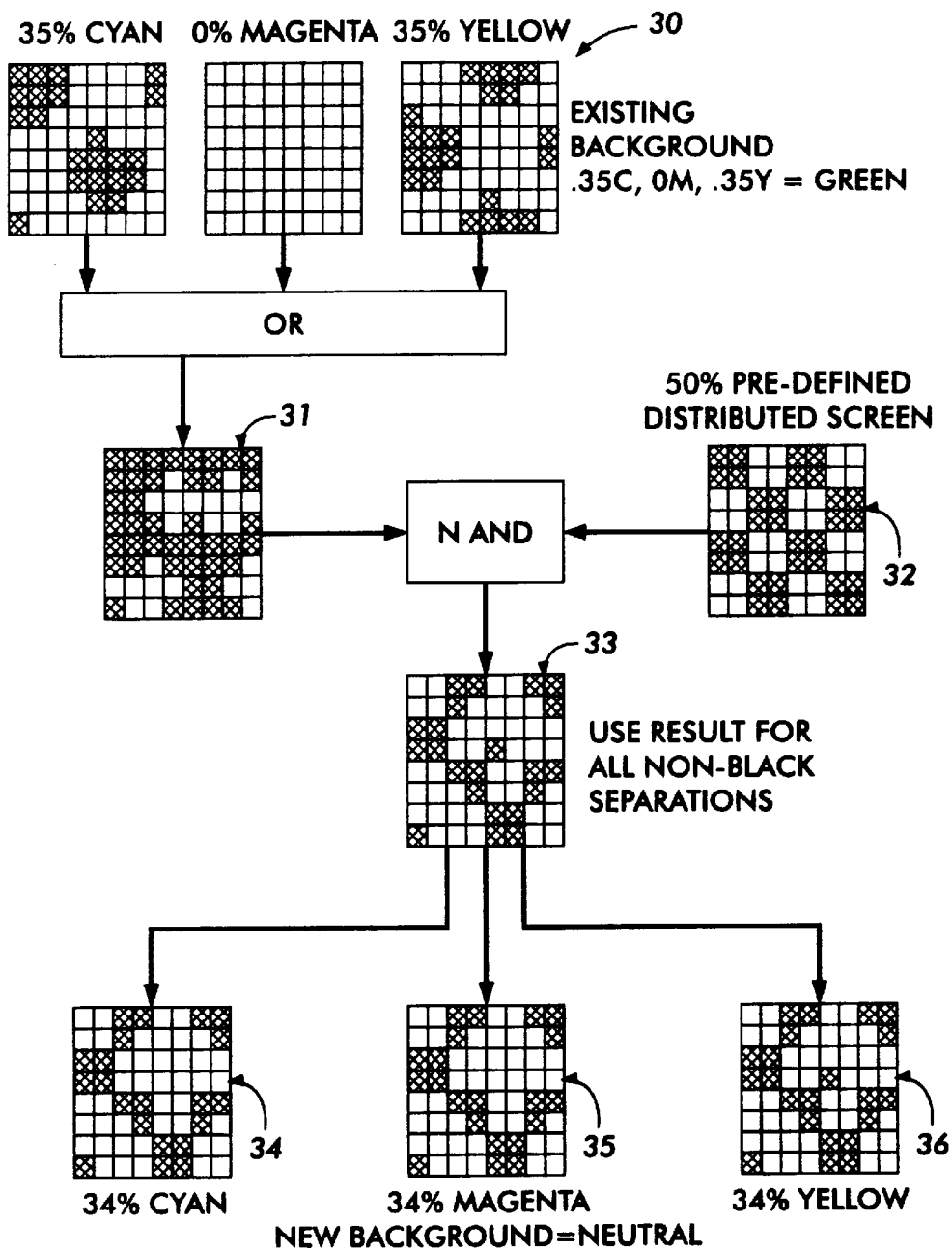
FIG. 11 illustrates in greater detail an OR-ing process by which the total bits in all non-black separations may be calculated in a dot-off-dot halftone system, and the system by which a mask may be used in an AND operation to write an equal fraction of that total into each of the non-black separations when merging a black object into the existing separation bitmaps.

FIG. 11 illustrates by example the OR/AND process occurring in FIG. 10. In FIG. 11, an existing green background 30 of 35% Cyan, 0% Magenta, and 35% Yellow is shown. It can be seen that the halftone dot used in the Cyan separation has very little overlap with the dot used in the Yellow separation. Thus, the OR-ing of the three separations produces a buffer 31 which accurately tracks the total number of bits on in all separations in this background. This total buffer 31 is one input to an AND process. The other input is a pre-defined distributed screen 32 which sets the allowed limit of colorant coverage per separation. The screen 32 is not designed for its rendering properties since it only occurs in a black object, masked by the black colorant. Rather, it is designed to be maximally effective as a clipping dot with which to limit the allowed colorant on the page beneath a black object, as shown in FIG. 10. Naturally, the actual correlated dot design used would depend on system properties such as minimum stable spot size. In this example, a limit of 50% coverage has been chosen. In a cmyk system, this would allow for a maximum of 250% total colorant in a process black object, i.e., 50%C+50%Y+ 50%M+100%K=250% total. In many systems, limiting the total colorant to 250% is sufficient to prevent the printing defect shown in FIG. 9. This limit, of course, may be set at any level, and the optimum level is system-dependent.

The ANDing of buffer 31 with limiting screen 32 produces a result which is in this case a 34% screen 33. That identical screen 33 is then used in each of the non-black separations of a black object, cyan 34, magenta 35, and yellow 36. Since the nonblack components are equal, their mixture will produce a neutral or near-neutral combination. Thus, a process black is produced whose total colorant amount is controlled by the existing background, limited by a pre-set limit, and neutral in color for optimum printing results.

Figure 12:
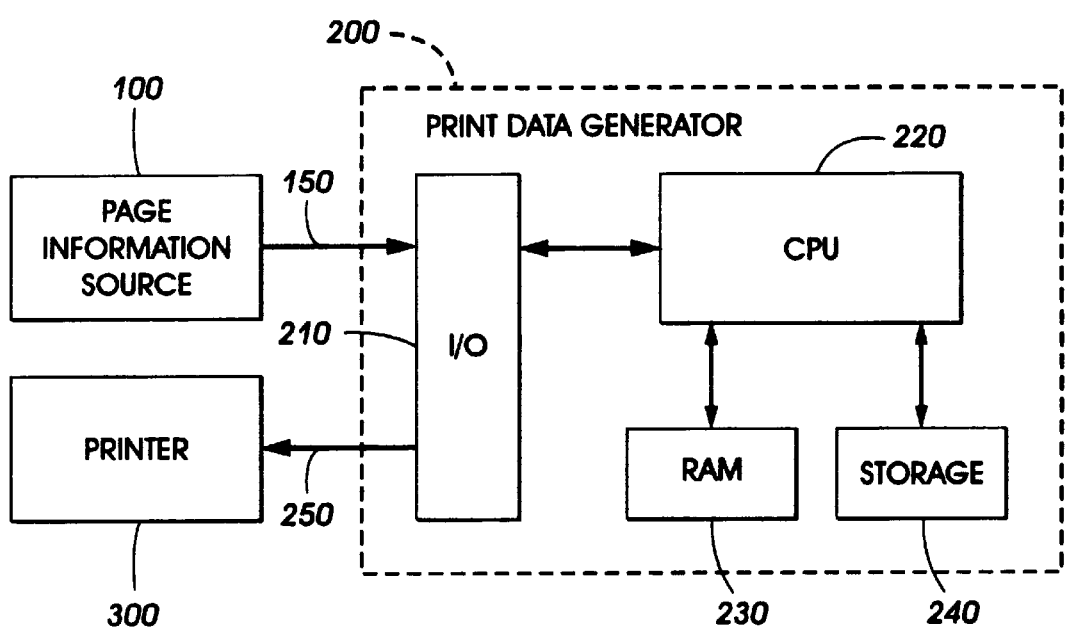
FIG. 12 is a block diagram of an apparatus made according to and for practicing the method of the invention, in which the changes to bitmaps according to the methods of the invention take place within the bitmap generator.

Referring now to FIG. 12, a generalized page printing system made according to the present invention is shown. It includes a page information source 100 connected via communication link 150 to a bitmap generator 200. Generator 200 is connected to a printer 300 via a communication link 250. Generator 200 includes an I/O controller 210, a CPU (central processing unit) 220, a RAM 230 which can store program and data information, and a storage apparatus 240 for non-volatile storage. These devices 210–240 may be any of a number of conventional devices generally available. Other hardware that accomplish the same functions can be used. As will be seen, various embodiments are realizable from this general structure.

Typically, page information source 100 may be a conventional work station or other computer system such as an IBM PC or Apple Macintosh. Communication link 150 may be a part of a computer network or a dedicated link. Bitmap generator 200 may be a dedicated computer attached to a printer 300 such as one of many electromechanical devices responsive to raster data for producing a printed page. Many other configurations are possible. For example, generator 200, programmed to function as described herein, could also be incorporated together in the same computer running the page source 100 software. In this case of shared computer hardware and separate software, the functions of page information source 100 and bitmap generator 200 remain distinct. The methods as described herein remain applicable through a wide range of apparatus configurations.

FIG. 12 shows an embodiment in which the bitmap generator 200 is programmed to carry out the methods described herein and shown in FIGS. 12–15. In this case, a page representation is received from a conventional page source 100. The page representation may be a conventional page description language such as the language available from Adobe Systems Incorporated known as PostScript, or an equivalent. In the page representation received from the page source 100, objects such as text, graphics, or pictures can be created and placed on the page in arbitrary order. The objects are defined by descriptive commands, some of which control the location, shape, orientation, and size of an object. At least one command controls the color of an object. An object's color may include neutral colors such as black and gray. Objects may overlap each other, and a priority method determines which objects are on top of other objects.

As further discussed herein, when a page representation is received from a conventional page source 100 by bitmap generator 200 and generator 200 is programmed to carry out the method of this invention, generator 200 may in certain situations modify the output commanded by the page representation. As described herein, generator 200 may change the composition of the color of a black object contrary to the command of the page representation before merging it into the generated print data. Thus, the page as sent by a conventional page information source 100 will be printed differently than described, in order to accomplish the objectives of this invention for improving print quality. The advantage of this configuration is that page representations received from any number and variety of conventional page sources 100 may be automatically modified by generator 200 to print with higher quality.

Figure 13:
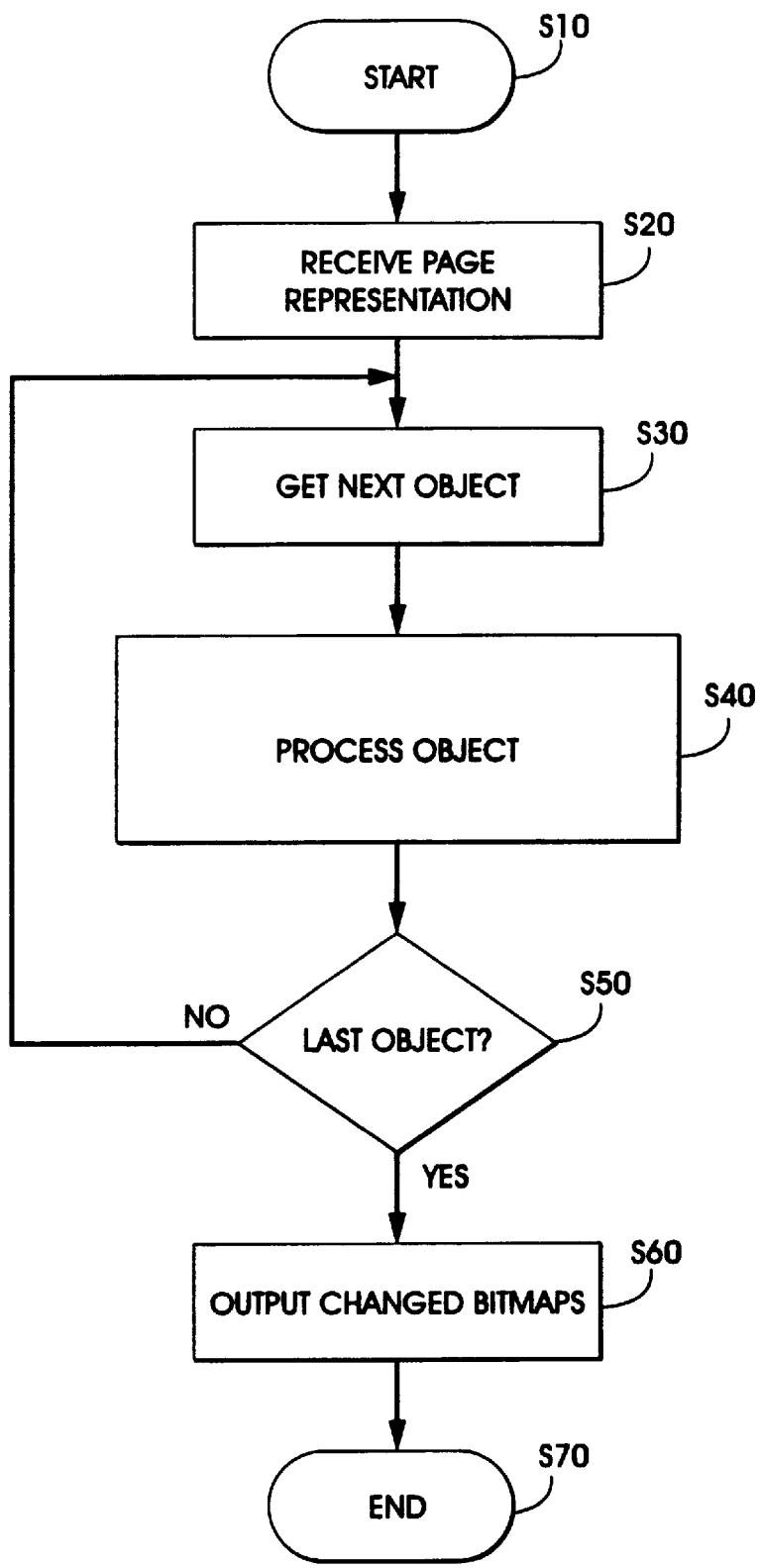
FIG. 13 shows a flowchart for the overall method by which a bitmap is produced from a more generic page representation.

FIG. 13 illustrates a generalized flow diagram of a process or method according to the invention by which a background and maximum limit dependent neutral black image is formed. After starting in step S10, in step S20 a page representation is received. This page representation represents a collection of colored objects in a data format such as a conventional page description language or equivalent data format as previously described.

In step S30, the next object which has not yet been processed is retrieved from the page representation. This retrieved object is further processed in step S40 as will later be described in greater detail. In step S50, it is determined if this is the last object to be retrieved from the page description language. If it is not the last object, then control returns to step S30 where the next object is retrieved. Otherwise, if this is the last object defined by the page description language, control flows to step S60 where the bitmap, which has possibly been constructed differently than commanded by the page representation during the object processing step S40, is output.

The outputted changed bitmaps of step S60 generally consist of one bitmap per separation, where each separation corresponds to a colorant used in the printing process, and where the bitmaps provide instructions for printing each spot on the printable page for use by a raster color printer. In this case, the output step involves outputting the modified bitmap data to a network, a printer or a storage device. Finally, control flows to step S70, where the process ends.

Figure 14:
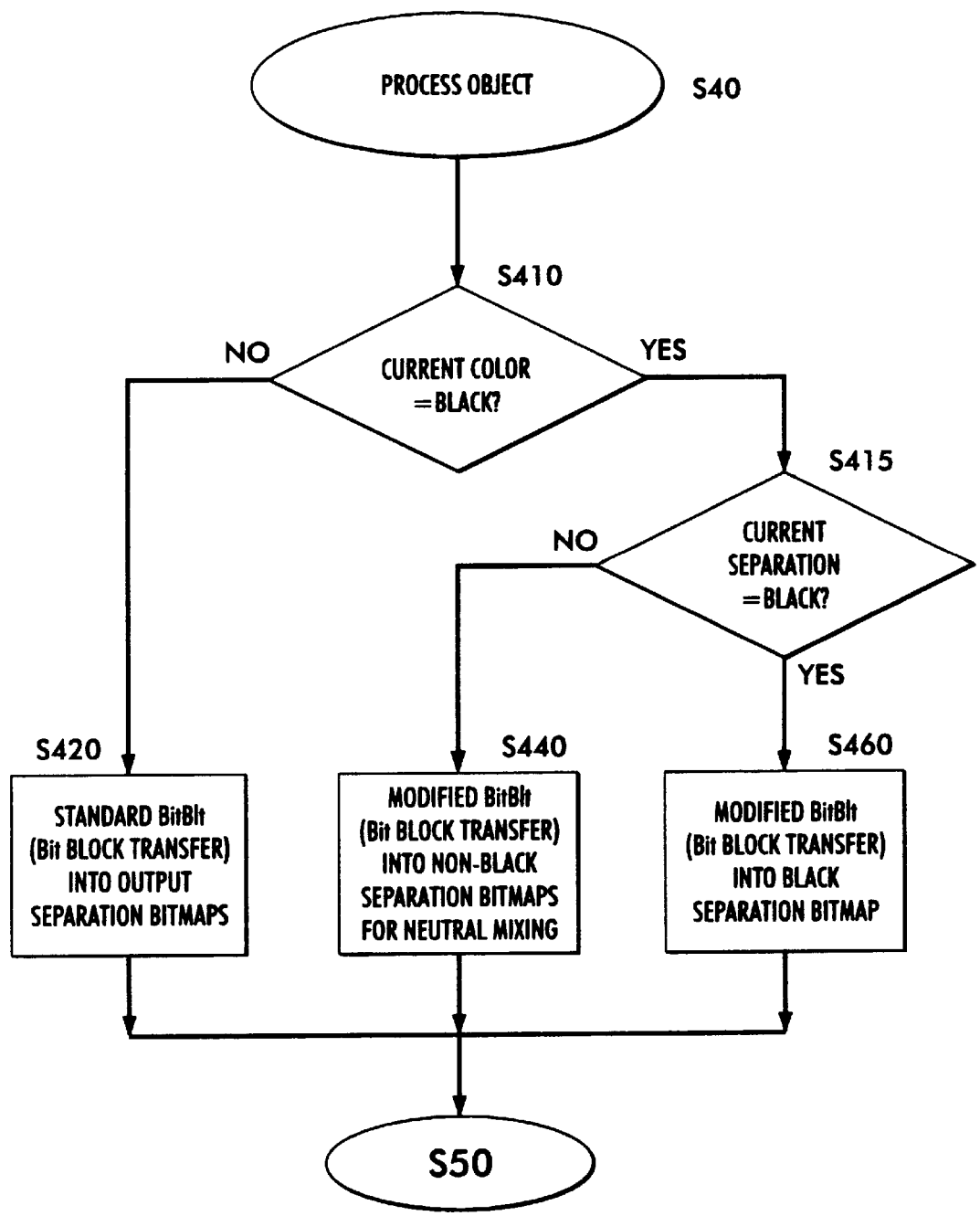
FIG. 14 shows the method by which each object is merged into the output bitmaps. Three different paths are shown, depending on whether the object is black or not, and for a black object, depending on whether the separation is black or not.

FIG. 14 shows in greater detail the step S40 of processing an object. In step S410, the color of the object to be processed is examined. The color of an object can be expressed in many color spaces or systems. However, in any commonly used color space it is possible to efficiently determine if the color black has been commanded. For example, some systems use an RGB color space, and black is generally defined in such systems as R=G=B=0. Other systems express colors as combinations of cyan (C), magenta (M), yellow (Y), and black (K). In such systems, black may be defined as C=M=Y=1, or alternatively as C=M=Y=K=1 (two forms of process black), or alternatively as K=1 (single-color black). In the L*a*b* system, L* is an expression of the luminance of a color, and L*=0 (zero luminance) is black. In practice, black may be defined more broadly if desired. For example, an L*<5 or a K>0.95 could be defined to be treated as black if desired. Some systems allow many color spaces to be used intermixedly, but in each case it is possible to define what combinations of the components of each color space will be defined as the color black.

If in step S410 the object color is not black, control flows to step S420, in which a standard BitBlt (Bit Block Transfer—described in FIG. 15) is performed to merge the object into the output separation bitmaps in such a way that it will be printed in the correct location, with the correct shape, with the correct relation to other objects on the page, and with the correct color.

Returning to step S410, if the object color is found to be black, the processing proceeds to step S415. If the current separation to be modified is not the black separation, processing proceeds to step S440 where a modified BitBlt, modified according to the methods of this invention, is performed to merge the non-black components of the object into the non-black output separation bitmaps in such a way that it will be printed in the correct location, with the correct shape, with the correct relation to other objects on the page, but with non-black components in its color which may have a different composition (changed by the methods of this invention) from the black color commanded by the received page representation. However, in step S415, if the current separation to be modified is the black separation, processing proceeds to step S440 where a modified BitBlt, described in the prior art, is performed to merge the black component of the object into the existing black output separation bitmap.

Figure 15:
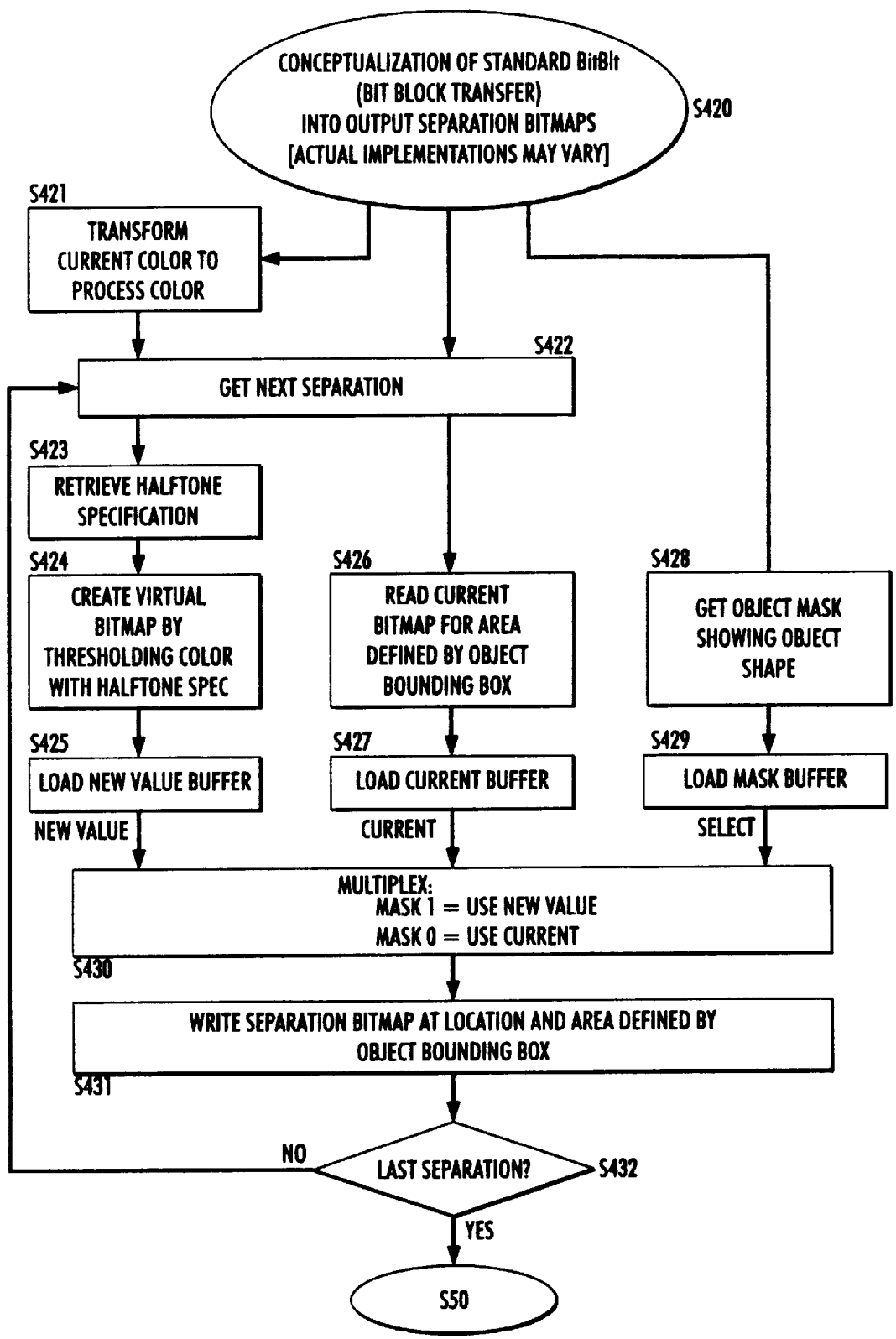
FIG. 15 illustrates conceptually the prior art method by which an object is normally merged into an existing bitmap, which represents the method still used in the invention for all non-black objects.

FIG. 15 shows conceptually the step S420 of performing a standard BitBlt (Bit Block Transfer) into a set of output bitmaps, one per separation. Actual implementations of this conventional step of merging an object into a bitmap may include modifications and special cases for performance reasons, but conceptually will be convergent with the steps shown in FIG. 15.

In step S421, the current color is retrieved from the graphical state and transformed into a process space. Although page description languages often allow the color of an object to be expressed in many different color spaces or systems such as calibrated RGB or L*a*b*, all must ultimately be transformed to the specific colorant values needed by the particular printing process to accurately render the desired color. This color space is called a process space, most generally CMYK (cyan, magenta, yellow, black).

After the current color is transformed, in step S422 a loop is entered which processes each separation in turn. Three paths are followed in parallel, each leading to the loading of a buffer.

In the first path, in step S423, a halftone specification is retrieved which defines the halftone dot used for this particular separation. In step S424, by thresholding the separation value for the current color against the halftone specification of the dot, a "virtual" bitmap is created which gives the bits which need to be turned on in this separation in order to print correctly the color value designated by the current color. For example, in CMYK color space, the C (cyan) separation will have a specified value. This value is achieved in reality by turning the right number of dots on or off in the printer as controlled by the halftone specification for the cyan separation. Once the virtual bitmap is defined, the value is loaded into a NewValue Buffer in step S425.

In the second path, in step S426 the currently existing bitmap is read at the exact location and area defined by the location and bounding box of the current object which is about to be merged. In step S427, these bits are loaded in order into a Current Buffer.

Finally, in the third path, in step S428, the mask which defines the shape of the object is retrieved, and in step S429, is loaded into the third buffer, the Mask Buffer.

Once all buffers are loaded, in step S430 a Multiplexing operation takes place, in which the Mask Buffer is used to select between the NewValue Buffer and the Current Buffer. Wherever the Mask is 0, that is, outside the defined shape of the object, the original Current bits are chosen to restore the bits that were already there. However, wherever the Mask is 1, that is within the object, the NewValue bits are chosen to be written as new data into the bitmap.

In step S431, the chosen bits are written into the existing bitmap in order, at the location where the object is to be written and in the size of the bounding box. This has the effect of writing the halftoned color of the object in exactly the location and shape defined by the mask.

Lastly, in step S432, the control loops back to step S422 if there are more separations to be processed, or exits to step S50 if this is the last separation.

Figure 16:
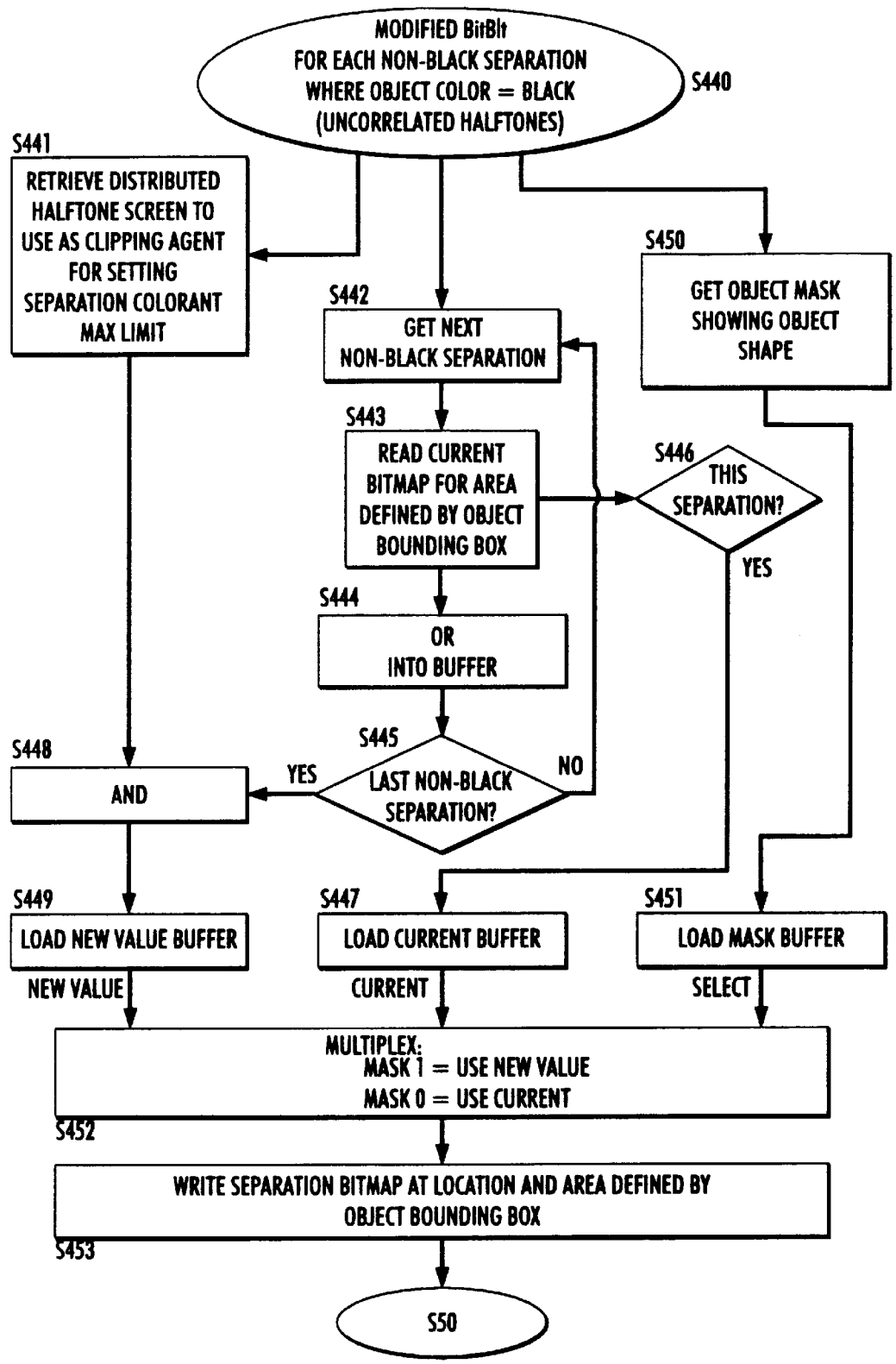
FIG. 16 illustrates conceptually the method of this invention for bitmap systems with halftone dots which are largely uncorrelated among the separations, wherein the non-black separations of a black object are each merged into the existing non-black bitmaps in such a way as to create a neutral-hued, toner-controlled black.

FIG. 16 shows conceptually step S440, a method according to this invention of performing a BitBlt (Bit Block Transfer) of one non-black separation of a black object into that separation's existing output bitmap. FIG. 16 shows the case in which the halftone specifications between separations are highly uncorrelated, meaning that dot placements do not tend to overlap each other between the separations (e.g., dot-off-dot). FIG. 16 would also cover the situation in which the dots are correlated (dot-on-dot), but a simple shift operation or similar simple manipulation would render them uncorrelated. This might occur, for example, if exactly the same dot were specified for each separation; in this case a simple shift after a read would shift one separation with respect to another and the result would become uncorrelated or dot-off-dot.

Actual implementations of this novel step of merging a non-black separation of a black object into a bitmap may include modifications and special cases for performance reasons, but conceptually will be convergent with the steps shown in FIG. 16. For each separation, three paths are followed in parallel, each leading to the loading of a buffer.

In the first path, in step S441, stored bits are retrieved which define the maximum colorant amount allowed for every non-black separation. The bits have been previously generated by retrieving a pre-set maximum colorant amount and running that value through a halftone generator, using a special distributed halftone specification as illustrated in FIG. 11. This pre-set screen will be used as a clipping agent to limit the amount of colorant laid down in any separation under a black object (all separations use the same limit since in this invention all non-black separations are always kept equal).

In the second path, steps S442 through S445 define a loop within which in step S443 each existing bitmap is read at the location and area defined by the object bounding box, and in step S444 the result of that read operation is OR'ed into a buffer. The final result of the loop is that the buffer shown in step S444 contains bits turned on wherever bits are turned on in any of the non-black separations. An example of an efficiency not shown in the flow diagram is that, once the buffer in S444 has been loaded while processing the current object for the first non-black separation, it need not be reloaded for the other two remaining separations.

Meanwhile, in step S446, if the existing bitmap that is being read in step S443 is for the separation being currently processed, then in step S447 it is loaded into a Current Buffer to complete the second path.

Back to the first path, in step S448, the bits retrieved in step S441 are ANDed logically and bitwise with the bits buffered in step S444. This has the result of limiting the halftoned bits in each separation to essentially the minimum of either the allowed colorant maximum or the total of all bits turned on in all separations, as shown earlier in FIG. 11. The result of the ANDing process, which is a lightened and/or clipped version of the all background bits expressed in a distributed halftone screen, is loaded into the NewValue Buffer in step S449.

Finally, in the third path, in step S450, the mask which defines the shape of the object is retrieved, and in step S451, is loaded into the third buffer, the Mask Buffer.

Once all buffers are loaded, in step S452 a Multiplexing operation takes place, in which the Mask Buffer is used to select between the NewValue Buffer and the Current Buffer. Wherever the Mask is 0, i.e., outside the defined shape of the object, the original Current bits are chosen to restore the bits that were already there. However, wherever the Mask is 1, i.e., within the object, the NewValue bits are chosen to be written as new data into the bitmap.

In step S453, the chosen bits are written into the existing non-black bitmap in order, at the location where the object is to be written and in the size of the bounding box. This has the effect of writing the non-black separations of the black object in exactly the location and shape defined by the mask, although with a halftone and value different from that commanded by the conventional page representation.

Lastly, control exits to step S50.

Figure 17:
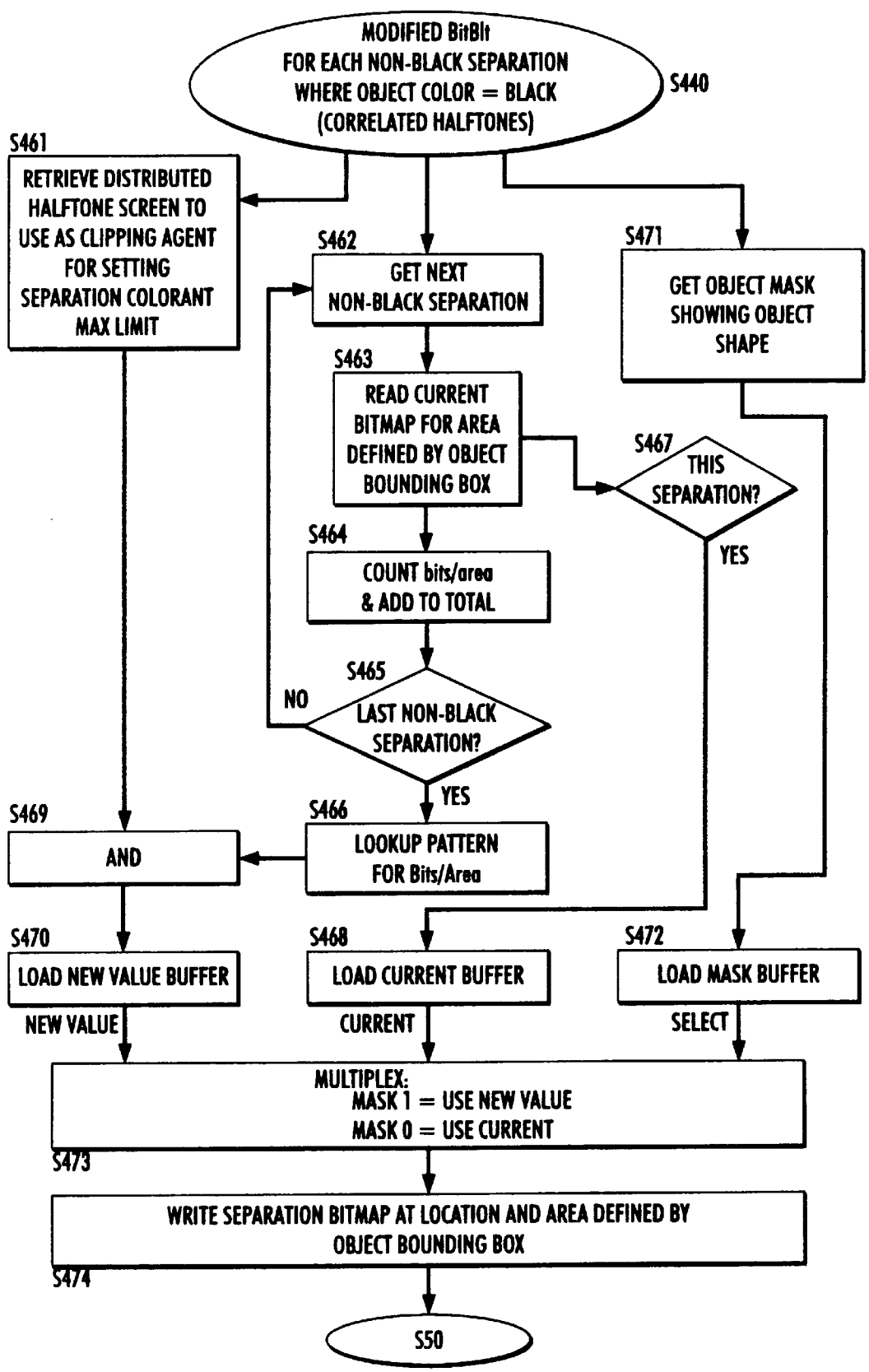
FIG. 17 illustrates conceptually the method of this invention for bitmap systems with halftone dots which have correlation among the separations, wherein the non-black separations of a black object are each merged into the existing non-black bitmaps in such a way as to create a neutral-hued, toner-controlled black.

FIG. 17 also shows conceptually step S440, a method according to this invention of performing a BitBlt (Bit Block Transfer) of one non-black separation of a black object into that separation's existing output bitmap. FIG. 17 shows the case in which the halftone specifications between separations are correlated, meaning that dot placements do tend to overlap each other between the separations (e.g., dot-on-dot). Actual implementations of this novel step of merging a non-black separation of a black object into a bitmap may include modifications and special cases for performance reasons, but conceptually will be convergent with the steps shown in FIG. 17. As in FIG. 16, for each separation three paths are followed in parallel, each leading to the loading of a buffer.

In the first path, in step S461, stored bits are retrieved which define the maximum colorant amount allowed for every non-black separation. The bits have been previously generated by retrieving a pre-set maximum colorant amount and running that value through a halftone generator, using a special distributed halftone specification as illustrated in FIG. 11. This pre-set screen will be used as a clipping agent to limit the amount of colorant laid down in any separation under a black object (all separations use the same limit since in this invention all non-black separations are always kept equal).

In the second path, steps S462 through S465 define a loop within which in step S463 each existing bitmap is read at the location and area defined by the object bounding box, and in step S464 the result of that read operation is processed as follows into a buffer: the bits read are counted using any of a number of efficient counting techniques, the result divided by the total area of the bounding box, and the resulting integer added to the accumulated sum for any previous separations. The final result of the loop is that the buffer holding the Total from step S464 contains a fairly accurate count of how many bits per unit area are turned on in all of the non-black separations.

Once the sum of bits/area has been obtained by reading all non-black separations, that sum may be used in step S466 to calculate, or, more efficiently, lookup a bit pattern that expresses the correct number of bits/area as determined by the sum in step S464. An example of an efficiency not shown in the flow diagram is that, once the result is found in S466 while processing the current object for the first non-black separation, it need not be re-determined for the other two remaining separations.

Meanwhile, in step S467, if the existing bitmap that is being read in step S463 is for the separation being currently processed, then in step S468 it is loaded into a Current Buffer to complete the second path.

Back to the first path, in step S469, the bits retrieved in step S461 are ANDed logically and bitwise with the result of step S466. This has the result of limiting the halftoned bits in each separation to essentially the minimum of either the allowed colorant maximum or the total of all bits turned on in all separations, as shown earlier in FIG. 11. The result of the ANDing process, which is a lightened and/or clipped version of the all background bits expressed in a distributed halftone screen, is loaded into the NewValue Buffer in step S470.

Finally, in the third path, in step S471, the mask which defines the shape of the object is retrieved, and in step S472, is loaded into the third buffer, the Mask Buffer.

Once all buffers are loaded, in step S473 a Multiplexing operation takes place, in which the Mask Buffer is used to select between the NewValue Buffer and the Current Buffer. Wherever the Mask is 0, i.e., outside the defined shape of the object, the original Current bits are chosen to restore the bits that were already there. However, wherever the Mask is 1, i.e., within the object, the NewValue bits are chosen to be written as new data into the bitmap.

In step S474, the chosen bits are written into the existing non-black bitmap in order, at the location where the object is to be written and in the size of the bounding box. This has the effect of writing the non-black separations of the black object in exactly the location and shape defined by the mask, although with a halftone and value different from that commanded by the conventional page representation.

Lastly, control exits to step S50.

Figure 18:
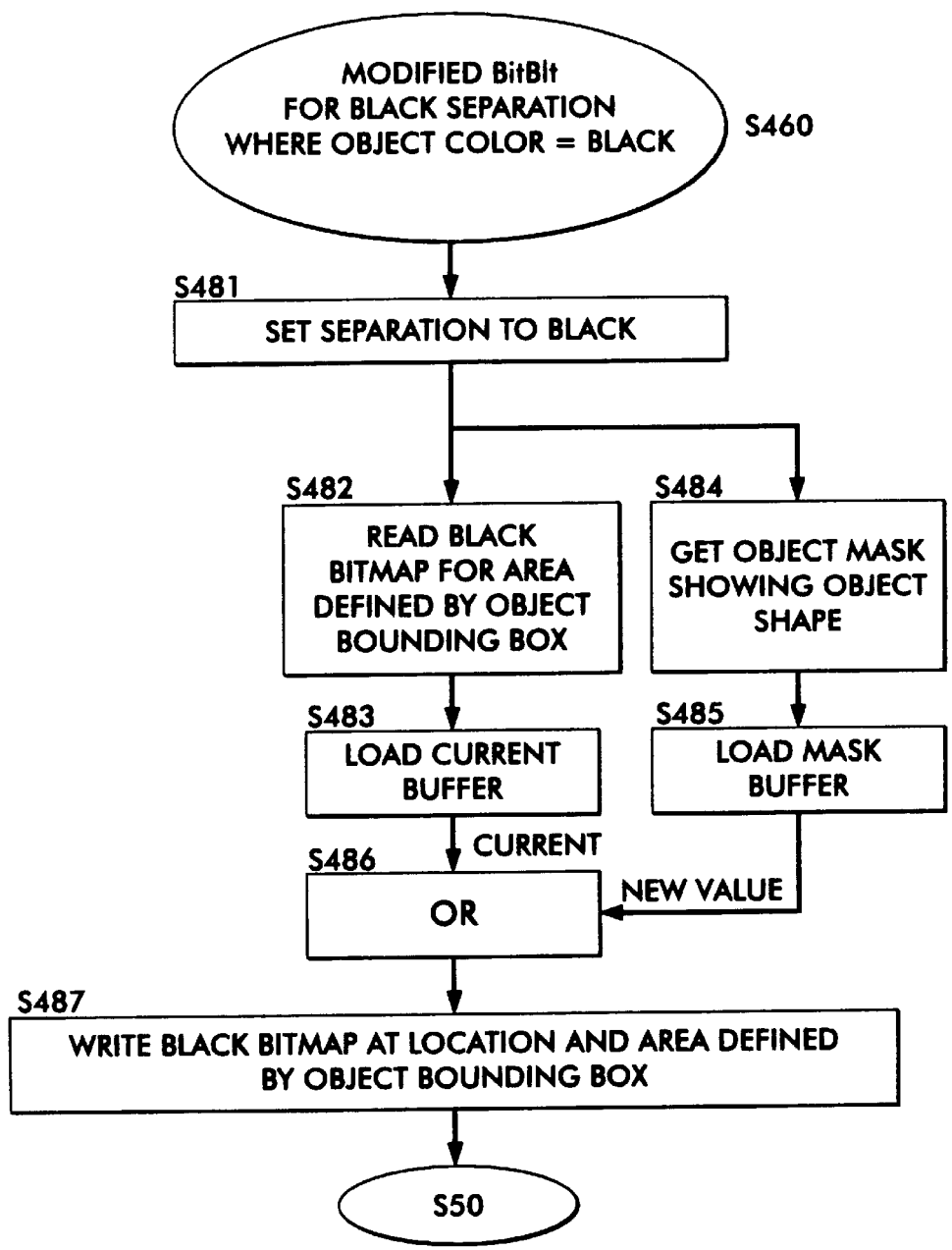
FIG. 18 illustrates conceptually a prior art method shown in patent application Ser. No. 08/673541 by which the black separation of a black object may be merged into the existing black bitmap.

FIG. 18 shows the steps used in the prior art shown in patent application No. 08/673541 for merging the black separation of a black object into the existing black bitmap. In step S481 the current separation is set to black. From step S481, control flows to two parallel paths, each of which load a buffer.

The first path, shown by steps S482 and S483, loads the Current Buffer by reading the black bitmap at the location and for the area defined by the current object bounding box. Similarly, the second path in steps S484 and S485 loads the Mask Buffer as described in FIG. 16.

In contrast with FIG. 16, Step S486 in FIG. 18 shows that the Mask Buffer is now used as the NewValue, and the Current Buffer as the Current, and the two buffers are no longer multiplexed but simply logical OR'd. This is because since we know the object is black (i.e., all bits turned on), the Mask Bits adequately define that color value (the Mask bits are all 1 (black) within the shape of the object). By OR-ing the two input streams, wherever the Mask is 0 (i.e., outside the shape of the object), the Current bits will be returned to their current value. However, wherever the Mask is on, 1 bits (black) will be written into the black bitmap. It would, of course, be possible to perform the black separation mixing as in FIG. 15, but the method described in FIG. 18 avoids both color transformation and multiplexing steps.

Finally, in step S487, the resulting bits are written into the black bitmap at the location and area defined by the bounding box of the current object, and control exits to step S50.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. The method of limiting the final colorant amount of one pixel of one separation of a number of non-black separations, said pixel comprising original colorant amounts, while printing an input color to a color printer comprising the steps of:

determining a total value of maximum colorant amount for the number of separations which can be printed by the printer, the total value being the addition of the maximum amounts of toner that can be printed for each separation, determining a smaller value for the amount of colorant for the number of separations which is smaller than the total value to limit the final colorant amount to a pre-set allowed total colorant, determining a total value for the sum of the values of the original colorant amounts in the number of separations, generating a first bitmap for the smaller value divided by the number, generating a second bitmap for the sum of original colorant values divided by the number, using the smaller of the two bitmaps to generate a final bitmap, and printing the final bit map.

2. The method of claim 1 wherein the bitmaps are halftone dots.

3. The method of claim 1 wherein the using step comprises reading each bit from either the first or second bitmap, logically combining it with the corresponding bit of the other bitmap, and using the result as a bit in the final bitmap.

4. The method of claim 1 wherein three color separations are cyan, magenta and yellow.

* * * * *